(12) United States Patent
Chen et al.

(10) Patent No.: US 8,980,186 B2
(45) Date of Patent: Mar. 17, 2015

(54) MINI-REACTOR OPTIMIZED CHANNEL SIZING

(75) Inventors: Peng Chen, Painted Post, NY (US); Yi Jiang, Horseheads, NY (US); James Scott Sutherland, Corning, NY (US); Andrew David Woodfin, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/201,919

(22) PCT Filed: Feb. 26, 2010

(86) PCT No.: PCT/US2010/025596
§ 371 (c)(1),
(2), (4) Date: Aug. 17, 2011

(87) PCT Pub. No.: WO2010/099449
PCT Pub. Date: Sep. 2, 2010

(65) Prior Publication Data
US 2011/0306088 A1    Dec. 15, 2011

Related U.S. Application Data

(60) Provisional application No. 61/156,499, filed on Feb. 28, 2009.

(51) Int. Cl.
*B01D 50/00*  (2006.01)
*B01J 19/24*  (2006.01)
*C04B 38/00*  (2006.01)
*B01J 35/04*  (2006.01)

(52) U.S. Cl.
CPC ......... *B01J 19/2485* (2013.01); *C04B 38/0009* (2013.01); *B01J 35/04* (2013.01); *B01J 2219/00117* (2013.01); *F01N 2330/30* (2013.01); *B01J 2219/2445* (2013.01)
USPC ............................................ 422/169; 422/171

(58) Field of Classification Search
USPC .......................... 422/169, 170, 168, 172, 171
See application file for complete search history.

(56) References Cited

U.S. PATENT DOCUMENTS

| 4,101,287 A | 7/1978 | Sweed et al. ............... 23/288 |
| 4,136,675 A | 1/1979 | Karasick .................... 126/271 |
| 4,426,762 A | 1/1984 | Schnedecker ............. 29/527.4 |
| 4,448,828 A | 5/1984 | Mochida et al. ............. 428/36 |
| 4,506,728 A | 3/1985 | Gentry ......................... 165/96 |

(Continued)

FOREIGN PATENT DOCUMENTS

| EP | 0787524 | 8/2002 | ............. B01D 63/06 |
| GB | 1040107 | 4/1964 | |

(Continued)

*Primary Examiner* — Natalia Levkovich
(74) *Attorney, Agent, or Firm* — Gregory V. Bean

(57) ABSTRACT

A honeycomb body is disclosed having cells extending along a common direction, a first plurality of the cells being open at both ends of the body and a second plurality of the cells being closed at one or both ends of the body, the second plurality of cells arranged in one or more groups of cells cooperating to define one or more fluid passages extending through the body at least in part perpendicularly to the common direction, wherein, in a plane perpendicular to the common direction, the ratio of the area of cells of the first plurality to the area of cells of the second plurality varies along the length of at least one of the one or more fluid passages.

3 Claims, 16 Drawing Sheets

(56) References Cited

U.S. PATENT DOCUMENTS

| | | | |
|---|---|---|---|
| 4,635,707 A | 1/1987 | Gentry | 165/1 |
| 4,711,298 A | 12/1987 | Rogier et al. | 165/165 |
| 4,746,479 A | 5/1988 | Hanaki et al. | 264/62 |
| 5,373,634 A | 12/1994 | Lipp | 29/890.03 |
| 5,641,332 A | 6/1997 | Faber et al. | 55/523 |
| 5,785,942 A | 7/1998 | Hippel et al. | 423/376 |
| 5,952,076 A | 9/1999 | Foster | 428/77 |
| 5,952,079 A | 9/1999 | Andou et al. | 428/116 |
| 6,077,436 A | 6/2000 | Rajnik et al. | 210/650 |
| 6,803,087 B2 | 10/2004 | Brew et al. | 428/116 |
| 2002/0192426 A1 | 12/2002 | Ichikawa et al. | 428/116 |
| 2003/0100448 A1 | 5/2003 | Cutler et al. | 502/345 |
| 2003/0152819 A1* | 8/2003 | Hatoh et al. | 429/32 |
| 2003/0190269 A1* | 10/2003 | Liu et al. | 422/168 |
| 2003/0227732 A1 | 12/2003 | Dessiatoun et al. | 361/103 |
| 2004/0067414 A1 | 4/2004 | Wei et al. | 429/166 |
| 2004/0161583 A1 | 8/2004 | Brew et al. | 428/116 |
| 2005/0181939 A1 | 8/2005 | Xu et al. | 502/325 |
| 2006/0090651 A1 | 5/2006 | Liu et al. | 96/121 |
| 2010/0143215 A1 | 6/2010 | Caze et al. | 422/198 |
| 2013/0259768 A1 | 10/2013 | Roberge et al. | 422/198 |

FOREIGN PATENT DOCUMENTS

| | | | |
|---|---|---|---|
| GB | 2374948 | 10/2002 | B01J 19/00 |
| WO | 2010/099449 | 9/2010 | B01J 19/24 |

* cited by examiner

MINI-REACTOR OPTIMIZED CHANNEL SIZING

PRIORITY

This application claims priority to U.S. Provisional patent application No. 61/156,499, filed Feb. 28, 2009, titled "Mini-Reactor Optimized Channel Sizing".

BACKGROUND

The present invention relates in general to channel structures for honeycomb body continuous flow chemical reactors and in particular to optimized channel structures in honeycomb body or honeycomb body extrusion reactors.

SUMMARY

A continuous flow chemical reactor provides one or more fluid channels that contain and transport reactants as they undergo a chemical reaction. The rate of the reaction at each point along the fluid channel is generally a function of the local reactant concentrations, the degree of reactant mixing, and the local temperature as described in Eq. 1:

$$\text{rate} \propto k_0 e^{\frac{-E_a}{RT}} C_A^\alpha C_B^\beta \quad (1)$$

wherein Ea is the activation energy in kJ/mol; $C_A$ and $C_B$ are local concentrations of species A and B in mol/L; T is the local reaction temperature; $\alpha$, and $\beta$ are power law factors with respect to reactant species concentration (typically >0), and $k_0$ is a "pre-exponential factor" and R is the gas constant.

As the reaction progresses, changes in local reactant concentration cause changes in the local rate of reaction. An example profile for reaction rate R as a function of channel position from zero to the full channel length L is shown in FIG. 1, where the reaction rate R increases rapidly as reactants mix and then gradually slows as reactants are consumed and the reaction progresses towards completion.

An increase in the reaction rate corresponds to an increase in the amount of heat generated or required by the reaction. In continuous flow chemical reactors heat exchange fluid channels are commonly located in close proximity to reaction fluid channels. Inadequate heat transfer capability at any location along the reaction channel will result in a change in reactant channel temperature that in turn generally alters the reaction rate. For example, two liquid reactants may react exothermically upon initial mixing, resulting in a sudden increase in reactant fluid temperature if the local rate of heat generation greatly exceeds the reactor's heat exchange capability. The result may be an undesirable change in the reaction product or a hazardous increase in channel pressure.

Commercial continuous flow chemical reaction systems are assembled from discrete chemical processing units. While the characteristics of each chemical processing unit may be varied by design, many geometrical parameters for a given chemical processing unit (e.g., channel size, wall thickness) cannot be easily changed along the flow path. For example, in a tubular reactor all tubes are nominally of constant diameter, so heat exchange from the bulk reactant fluid to the tube wall cannot be easily changed. The heat exchange performance associated with heat transfer at the exterior of the tube may vary along the tube, but in a way that is dictated by the bulk heat exchange fluid flow configuration (e.g., co-flow, counterflow or crossflow heat exchange).

If a single chemical processing unit is selected for a given continuous flow chemical reaction, the relationship between (for example) reactant channel dimensions and heat exchange performance along the fluid flow path is predefined. This relationship may not be the particular relationship that yields optimum reaction conditions for a given chemical reaction. For example, if a tubular heat exchanger is used to carry out the reaction with rate profile shown in FIG. 1, the tube diameter must be sized to meet the heat transfer requirements associated with the peak of the reaction rate plot. In other locations along the tube heat exchange requirements are not as great, so in these regions the heat exchanger is over-performing. The over-performing channel sections are smaller than they need to be, resulting in unnecessary pressure drop across these sections. Therefore the non-optimal channel dimensions lead to increased operating costs. Additionally, if a narrowly defined range of operating temperature is required for reaction activity or product selectivity, the over-performing channel sections may yield sub-optimal performance at locations away from the peak of the reaction rate plot.

A given reaction may carried out using more than one chemical processing unit along the fluid flow path, with each processing unit optimized for its segment of the reaction. While this configuration may approach optimum operating conditions, it may not be desirable to join a series of chemical processing units together because of costs associated with implementing and managing fluidic interconnections.

Chemical reactors with high reactant channel surface-to-volume ratio and large internal volumes can be fabricated using a honeycomb extrusion process. These devices may provide long internal serpentine channels by forming a series of fluidic channel U-bend turns at each end face. U-bend turns may be formed, for example, by machining a shallow trench through a series of cells using a router and then by sealing the top of the trench using a plug material. Heat exchange fluid channels may be positioned adjacent to these serpentine channels to control reactant temperature. Manufacturing techniques as well as some reactor designs are described in published applications by the present inventors and/or their colleagues, including for example, PCT publications WO2009108356A1 and WO2009088464A1, the contents of which are incorporated herein by reference, for purposes of U.S. law.

According to one aspect of the present invention, a honeycomb body having cells extending along a common direction is provided having a first plurality of the cells open at both ends of the body and a second plurality of the cells closed at one or both ends of the body. The second plurality of cells is arranged in one or more groups of cells cooperating to define one or more fluid passages extending through the body at least in part perpendicularly to the common direction, and at least one of said fluid passages varies in cross section along the length thereof. The at least one fluid passage may desirably decrease than increase in cross section along the length thereof, and may vary in a continuous or step-wise fashion.

According to another aspect of the present invention, a honeycomb body is provided having cells extending along a common direction with a first plurality of the cells open at both ends of the body and a second plurality of the cells closed at one or both ends of the body, and with the second plurality of cells arranged in one or more groups of cells cooperating to define one or more fluid passages extending through the body at least in part perpendicularly to the common direction. In a plane perpendicular to the common direction, the ratio of the area of cells of the first plurality to the area of cells of the second plurality varies along the length of at least one of the one or more fluid passages. The ratio may desirably increase then decreases along the length of the at least one of the one or more fluid passages.

According to yet another aspect of the present invention, a reactor for reacting fluids is provided, the reactor comprising a plurality of honeycomb bodies, with each body having cells extending along a common direction and having a first plurality of said cells open at both ends of the body and a second plurality of said cells closed at one or both ends of the body, and with each second plurality of cells arranged in one or more groups of cells cooperating to define one or more first fluid passages extending through the respective body at least in part perpendicularly to the common direction. The bodies are arranged to allow a second fluid passage to extend successively through the first plurality of cells of each body and the ratio of the area of cells of the second plurality to the area of cells of the first plurality varies along the length of the second fluid passage. The ratio may desirably increase then decrease along the length of the second fluid passage.

According to still another aspect of the present invention, a method of conducting a continuous-flow chemical reaction within a honeycomb body is provided the method comprising selecting a reaction to perform, determining the heat transfer required by the reaction along a continuous flow path, providing a honeycomb body having a reaction passage defined therein and heat exchange passages defined therein, wherein ratio of the area of heat exchange passages to the area of reaction passage is high where high heat exchange is required and low where high heat exchange is not required by the reaction.

By means of some aspects of the present invention, heat transfer and pressure drop performance of a continuous flow chemical reactor fabricated using a honeycomb extrusion substrate may be maximized both by adjusting the layout of reactant channels on substrate end faces and by varying the size of reactant channels along the reactant path. Reactant channel size variation can be discrete or continuous. Multiple honeycomb extrusion substrates can also be stacked so that reactant fluid flows through the short straight channels parallel to the extrusion axis. In this case the sizes of the short straight channels can be modified either discretely or continuously from substrate to substrate in the stack.

Performance advantages of some or all of these embodiments may include (1) significant reduction of total pressure drop over a reactant channel—as much as 80%-85% reduction from a non-optimized straight channel structure—by discretely or continuously varying reactant channel size; (2) reduced total reactor footprint in a given operation by optimization of heat transfer along the reactant channel; and (3) higher yield and/or better reaction control by tailoring the reactant/heat transfer channel size and length for the needs of a given reaction.

DETAILED DESCRIPTION

Figure 2A:
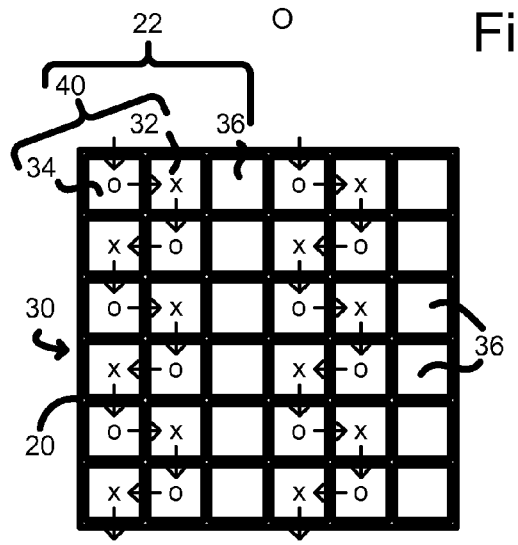
FIGS. 2A-2C are three different examples of channel layout patterns that may be repeated across the end face of a honeycomb body.
Figure 2B:
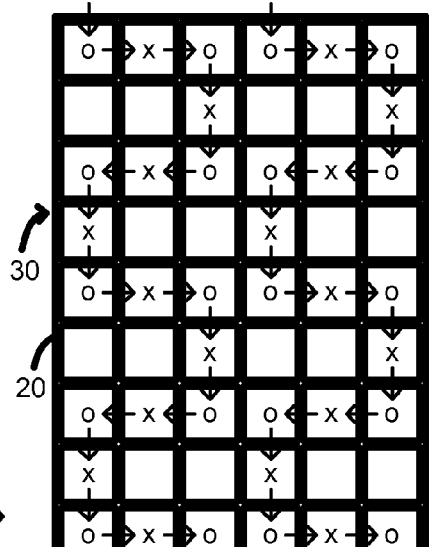
Figure 2C:
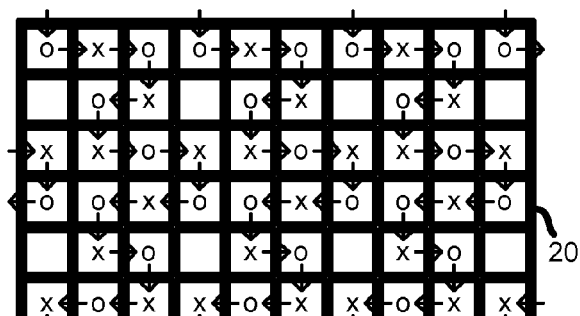

Techniques for modifying the heat exchange performance and reactant channel utilization by adjusting the way channels are laid out on a honeycomb body reactor substrate end face have been developed by one or more of the present inventors or their colleagues. For example, FIG. 2 shows three different channel layout patterns 30 that may be repeated across an end face of a reactor formed in a honeycomb body 20. Cells 32 marked with an "x" have downward flow and cells 34 marked with an "o" have upward flow of reactant fluid along an up-and-down serpentine path in honeycomb extrusion substrate channels 22, and empty cells 36 represent the positions of heat exchange channels in close proximity to the reactant fluid channels 40. Arrows 38 along the reactant fluid path depict the direction of fluid flow in the direction from channel to channel of the reactant channels 40. In a practice the arrows 38 typically correspond to locations where end face walls are machined to form U-bend turns in the fluid path.

Figure 3:
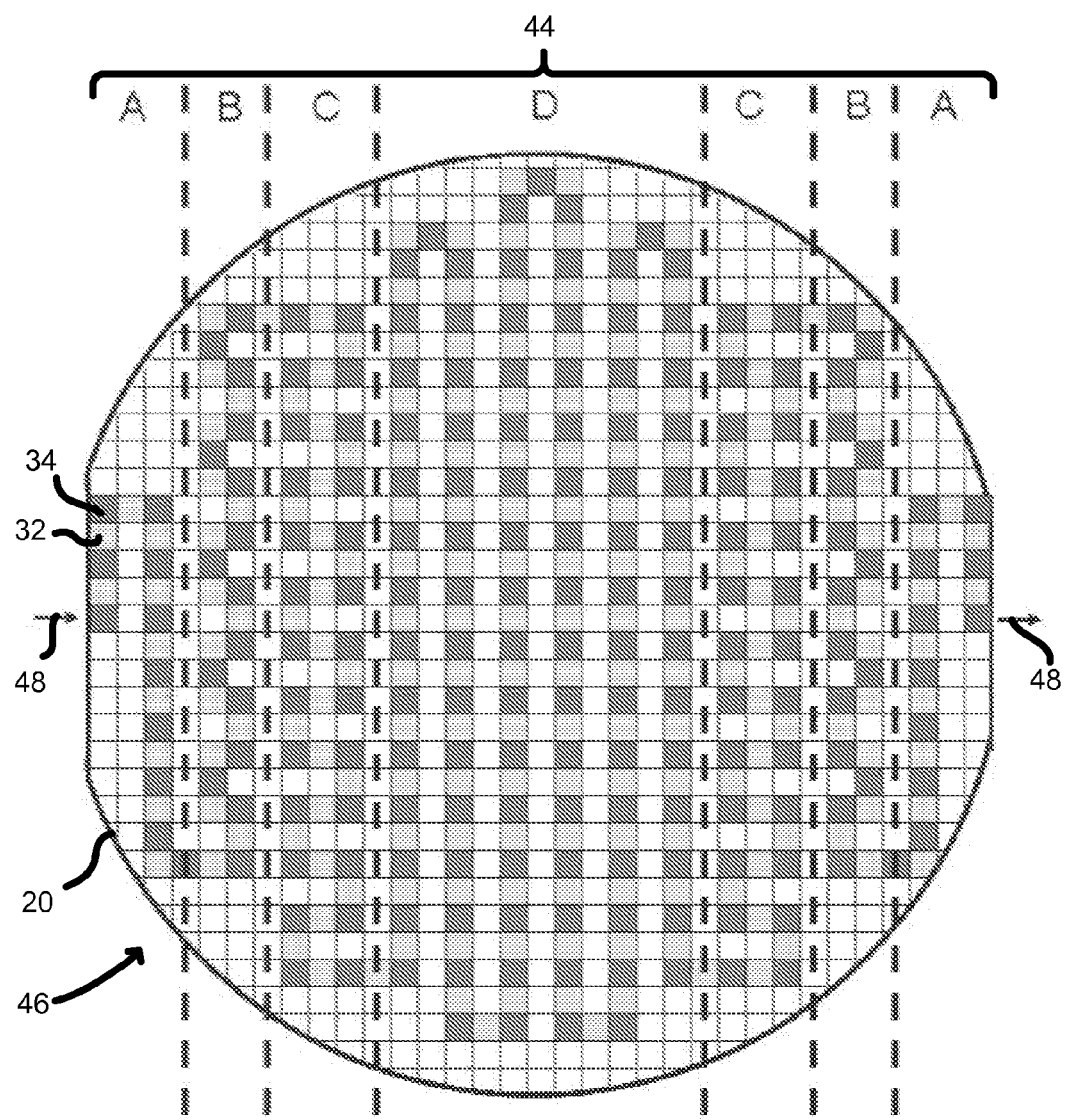
FIG. 3 is a cross section or end face of a honeycomb body employing different channel layout patterns in different zones of the end face.

While the previous application describes how patterns may fill the entire substrate end face, one new approach disclosed herein is to employ different channel layout patterns in different zones of the end face. An example is shown in FIG. 3, with dark grey cells 34 indicating upward flow and light grey cells 32 indicating downward flow, and where four different channel layout patterns A-D are shown in the respectively indicated zones 44 of the end face 46 of the honeycomb body 20. Entry an exit locations for the reaction path are indicated by the arrows 48. Heat exchange performance may be optimized along the reaction path to match changes in the reaction rate for a given reaction or class of reactions. This approach would also maximize the reactant channel utilization fraction over the entire end face, reducing the overall size of a reactor needed to provide a given reaction residence time.

Figure 1:
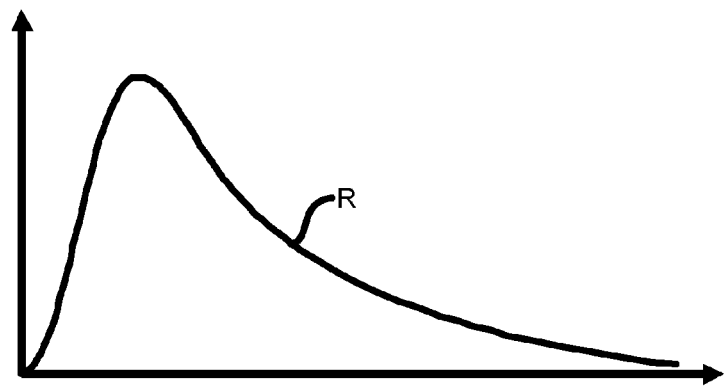
FIG. 1 is a graph of an example profile for reaction rate as a function of channel position from zero to the full channel length L.

For the channel layout patterns presented above in FIGS. 1-3, the ratio of heat exchange channels to reactant channels varies from design to design. Therefore the frontal area of channels available for heat exchange can vary across the substrate end face. Heat exchange fluid introduced above one honeycomb body reactor end face will preferentially flow through regions of the substrate end face where the density of heat exchange channels is greatest. As a result reactant channel heat exchange can be locally adjusted by at least three geometrical factors: (1) mean distance between reactant channels and heat exchange channels in a given region; (2) the number of heat exchange channels relative to the number of reactant channels in a given region (e.g. local heat exchange channel density); and (3) the variation in local heat exchange channel density moving across the substrate end face.

An advantage of the reactant channel optimization technique described here is that it can be implemented using honeycomb extrusion substrates that have uniform channel geometry across the substrate end face. A disadvantage is that the reactant channel cross-sectional area cannot easily be modified along the channel path to optimize pressure drop performance.

Reactant Channel Scaling

An optimized reactant channel design provides adequate heat transfer performance at each location along the reactant channel flow path while minimizing reactant channel pressure drop. Since the reaction rate is generally non-uniform along the reactant channel path, the reactant channel can be enlarged in regions where heat transfer requirements are not extreme to reduce overall pressure drop. Since heat transfer performance is generally reduced as the reactant channel is enlarged, care must be taken to ensure that any locally enlarged reactant channel sections meet all local heat transfer requirements.

Figure 4:
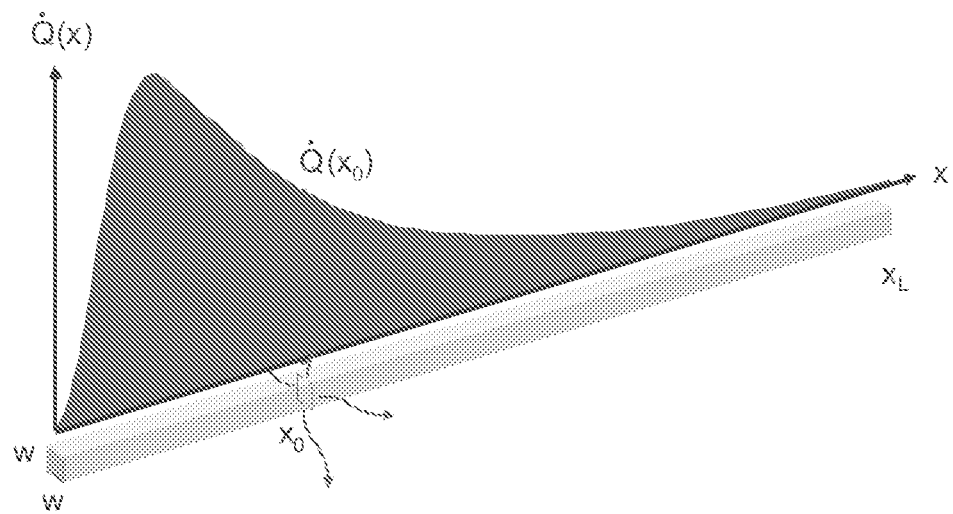
FIG. 4 is a graph of heat generation 6 along the length of a reactant channel using the reaction of FIG. 1.

FIG. 1 plots an example reaction where the reaction rate changes along the reactant channel path. The reaction rate change occurs due to a change in the number of moles involved in the reaction due to mixing and/or consumption of reactants. As the reaction rate changes, the amount of heat generated along the reactant path also changes. FIG. 4 shows corresponding heat generation $\dot{Q}$ along the length of the reactant channel. Here it is assumed that the reactant channel is of uniform cross-section (w×w) and total length $x_L$.

For many reactions it is desirable that the reactant temperature remain within a narrow range to minimize production of undesirable reaction by-products. The reactant channel and surrounding heat exchange channels should be designed to provide sufficient heat transfer performance to prevent unwanted reactant channel fluid temperature excursions.

The local convective heat transfer coefficient h(x) measures the convective heat transfer through a given fluid-wall interface surface per °C. temperature difference between the wall and the bulk interior of the fluid and per unit area of the wall interface. If the following parameters are known the desired local convective heat transfer coefficient h(x) may be calculated: (1) maximum desirable reactant channel bulk temperature excursion $\Delta T$ away from the heat exchange fluid bulk temperature; (2) amount of heat generated by the reaction in a given channel section of length dL; and (3) wall interface area dA over which the heat exchange takes place.

Figure 5A:
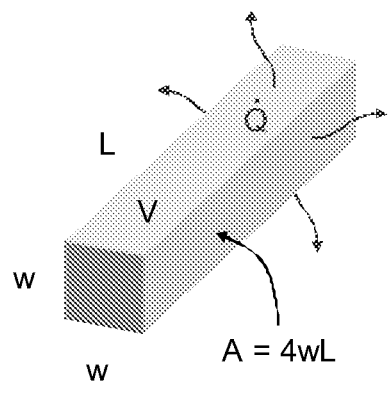
FIGS. 5A and 5B are representations of units of initial reaction channel structure and altered reaction channel structure, respectively.

Consider a short segment of reactant channel of length L that is of uniform cross-section (w×w) along its length represented in FIG. 5A. The total volume of reactant fluid enclosed by the short segment is $V=w^2L$. The total heat generation over the length of the channel ($\dot{Q}$) is assumed to be uniform. It is also assumed that the channel provides sufficient heat transfer so that all heat generated or consumed in the channel is immediately transferred through the channel wall interface. If the reactant flow rate is high and/or the channel heat transfer is low, the value of $\dot{Q}(x)$ can be modified to include energy gains or losses due to fluid flow at the channel inlet and outlet.

Heat transfer $\dot{Q}$ through the four sidewalls of the reactant channel occurs over a total area A=4wL. The local heat transfer coefficient $h_{req}$ needed to maintain a temperature difference of $\Delta T$ between the reactant bulk temperature and the surrounding heat exchange channel bulk temperature is $h_{req}=\dot{Q}/A\Delta T$.

Figure 5B:
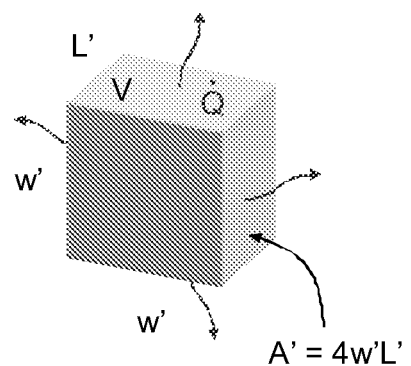

To reduce the reactant channel pressure drop the cross-section of the channel segment can be increased to w'×w' (FIG. 5B), where w'=s' w and s' is a channel scaling factor. The volume of the new channel segment can be forced equal to the original channel segment by setting the length of the channel $L'=L/(s')^2$. Since the new channel segment encloses the same volume, it also exhibits the same heat generation $\dot{Q}$ (assuming high sidewall heat transfer and/or relatively slow reactant flow).

The resized channel segment has a sidewall area $A'=4w'L'=4(s'w)L/(s')^2=A/s'$. The local heat transfer coefficient $h_{req}'$ needed to maintain a temperature difference of $\Delta T$ between the reactant bulk temperature and the surrounding heat exchange channel bulk temperature is $$h_{req}'=\dot{Q}/A'\Delta T=\dot{Q}s'/A\Delta T=s'h_{req}. \qquad (2)$$

As the channel width and height are both increased by a factor s', the heat transfer coefficient needed to maintain constant reactant channel thermal conditions increases by a factor of s' (Note this assumes the reaction heat generated or consumed is proportional to elemental reactor volume, which is typically true for homogeneous catalytic reaction and non-catalytic reaction systems).

In laminar flow an increase in reactant channel size increases the thickness of the thermal boundary layer near the channel sidewalls, resulting in a decrease in heat transfer performance. Finite element modeling of heat transfer from an array of square reactant channels adjacent to an array of square heat exchange channels confirms this expectation.

Figure 6:
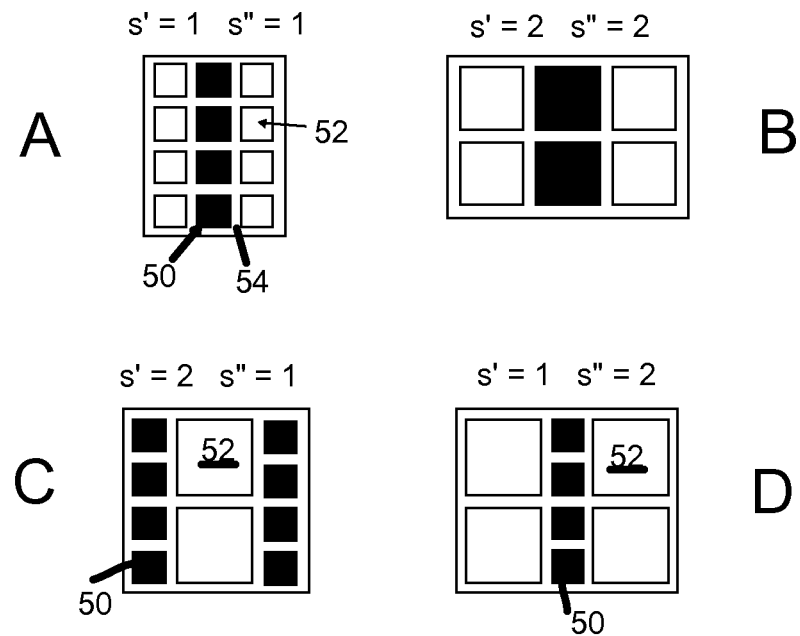
FIG. 6A-6D are various channel configurations for reactant channels adjacent to heat exchange channels.

FIG. 6A shows an initial channel configuration where the sizes of the reactant channel s 50 and heat exchange channels 52 are equal and separated by walls 54. The channel width is represented by w. For this initial configuration the reactant channel scaling factor s' equals 1. A similar scaling factor for the heat exchange channel, s", also equals 1. "$h_0$" is used to represent the total heat transfer coefficient between the reactant and heat exchange channels for this s'=1, s"=1 configuration.

When both the reactant and heat exchange channels are increased in size by the same amount (as in FIG. 6B) simulation results show that the new heat transfer coefficient is $$h' = 2h_0/(s'+s''). \quad (3)$$

This result is valid as long as the rate of heat transfer through the channel wall is much greater than heat transfer in either the reactant or heat exchange channels. This is true for alumina honeycomb body reactors that use liquid reactant and heat exchange fluids and that have channel wall thickness 0.2-0.3 times the channel width. The equation h'=2$h_0$/(s'+s") should also remain true in configurations where s'≠s" such as FIGS. 6C and 6D.

Once equations for the needed heat transfer coefficient ($h_{req}'$=s'$h_{req}$) and the available channel heat transfer (h'=2$h_0$/(s'+s")) are obtained the next step is to set $h_{req}'$=h' and solve for s'.

$$s' = \sqrt{\frac{2h_0}{h_{req}} + \frac{s''^2}{4}} - \frac{s''}{2} \quad (4)$$

This equation provides the optimal reactant channel scaling that will meet desired reactant channel heat transfer performance while being as large as possible to minimize pressure drop. If the sizes of the reactant channel and heat exchange channel are equal (s"=s') the equation can be simplified:

$$s' = \sqrt{\frac{2h_0}{h_{req}}} \quad (5)$$

If the reactant channel size is allowed to be scaled but the heat exchange channel size is fixed at s"=1 the equation is $$s' = \sqrt{\frac{2h_0}{h_{req}} + \frac{1}{4}} - \frac{1}{2} \quad (6)$$

Continuous Scaling of Reactant Channels

The advantages of continuous scaling of the reactant channel size will now be demonstrated using an example reaction. Consider a reaction that has been previously characterized in a $L_{max}$=25 m long tube of uniform 1 mm×1 mm cross-section (w×w where w=1 mm) A theoretical estimation of reaction rate variation along the channel can be used to calculate a desired heat transfer coefficient $h_{req}(x)$ as graphed in FIG. 7. While the shape of the curve may vary from reaction to reaction the general form is typical, with a peak appearing shortly after the channel inlet. Based on channel geometry and thermodynamic properties of reactant liquids it will be assumed that the maximum possible heat transfer out of the 1 mm×1 mm channel is given by $h_0$=1000 W/m²-K. For this example the total pressure drop along the reactant channel is given by ΔP=1 bar.

The example reaction will be implemented using an l=0.1 m long honeycomb extrusion body reactor where each reactant channel can be individually sized to optimize heat transfer and pressure drop performance. Individual channels of various sizes are joined together using substrate end face U-bends to form a single continuous channel through the device.

To select the appropriate reactant channel size the following steps may be followed:

1. Determine the position along the initial square channel where analysis of reactant channel resizing will begin. On the first pass this starting position is $x_{start}$=0.
2. Select a range of s' values for which the reactant channel resizing will be carried out. For example, s' could range from 1 to 4 in steps of 0.02. In our present example this would correspond to reactant channel sizes of 1-4 mm in 0.05 mm steps.
3. Starting with lowest s' value calculate the volume of a resized reactant channel that runs the length of the substrate. Since the substrate is l=0.1 m long this volume V' will equal s'w×s'w×l.
4. Calculate the length of original square channel that has the same volume as V'. This length will be L=(s')²×0.1 m in the present example.
5. Set the analysis endpoint along the original square reactant channel $x_{end}$=$x_{start}$+L.
6. Over the original square channel range $x_{start}$ to $x_{end}$ identify the maximum desired heat transfer coefficient and set it equal to the variable $h_{req}$.
7. Calculate the desired heat transfer coefficient for a resized reactant channel using Eq. 2 ($h_{req}'$=s'$h_{req}$).
8. Calculate the heat transfer coefficient for the resized reactant channel using Eq. 3 (h'=2$h_0$/(s'+s")).
9. Compare the values of h' and $k_{req}'$:
   If h' is greater than $h_{req}'$ then it is still possible to increase s' and still meet reactant channel heat exchange requirements. In this case repeat steps 3-7 with after increasing the size of s' by the s' step value.
   If h' is equal to $h_{req}'$ then the new reactant channel is sized for optimal heat transfer with minimum pressure drop, so continue to step 10.
   If h' is less than to $h_{req}'$ then recover the previous value of s' and continue to step 9.
10. Calculate the pressure drop for the new reactant channel via ΔP×(l/$L_{max}$)/((s')²)².
    The numerator (ΔP×(l/$L_{max}$)) calculates the pressure drop associated with the original w×w (1 mm×1 mm) cross-section running a l=0.1 m length within the honeycomb body reactor substrate.
    The denominator is squared once to calculate the cross-sectional area of the resized reactant channel relative to the original w×w (1 mm×1 mm) channel, and squared a second time to accommodate the variation in channel pressure drop with the square of channel cross-section.
11. To calculate the next resized reactant channel dimensions set $X_{start}$ equal to the previous end value and go to step 2. If $x_{start}$ exceeds the original square channel length (25 m) channel sizing analysis is complete so go to step 12.
12. Calculate the total pressure drop ΔP' associated with the set of resized reactant channels by summing all pressure drops calculated for each new resized reactant channel.

Figure 7:
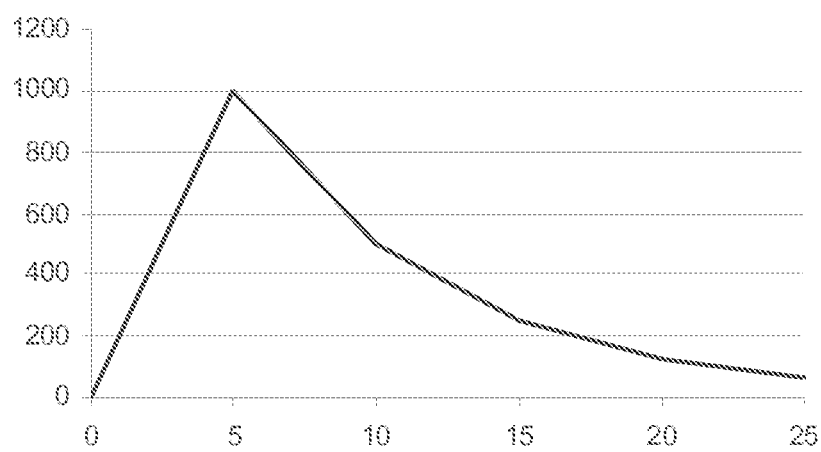
FIG. 7 is a graph of an example of a desired heat transfer coefficient in $W/m^2K$ in as a function of position along a channel or passage in meters.

The example process above has been carried out for the example heat exchange requirements of FIG. 7, taking two configurations into account regarding sizing of heat exchange channels adjacent to reactant channels: (1) s"=s': the size of adjacent heat exchange channels equals the size of reactant channels; and (2) s"=1: the size of adjacent heat exchange channels is set equal to the smallest reactant channel size.

Figure 8:
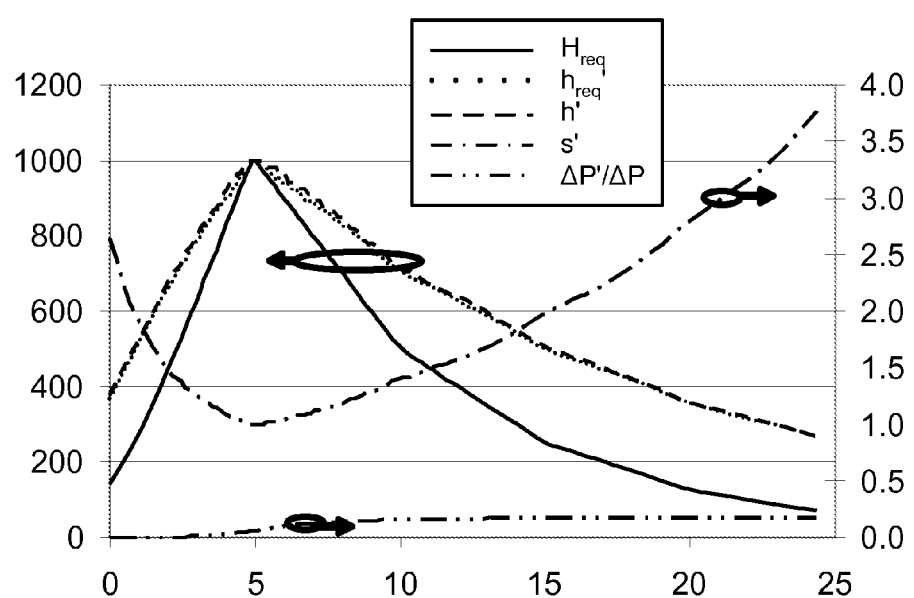
FIG. 8 is a graph showing the variation of a resized reactant channel to closely match heat transfer requirements of the reaction depicted in FIG. 7 for a first heat exchange case (s"=s'), including performance results in the form of pressure drop improvement.

Results are plotted for the first case (s"=s') in FIG. 8, with the bottom axis in meters and the left axis in W/m²K As expected, the reactant channel size has been scaled along its length through the s' parameter so that at all points $h_{req}'$ and h' are equal or nearly equal. The total pressure drop along the reactant channel ΔP' has been plotted as the ratio ΔP'/ΔP to highlight the improvement over the original uniform square channel. This ΔP'/ΔP ratio reaches a maximum value of 0.17 at the end of the channel, indicating that the total pressure drop for the resized reactant channels is only 17% of the original 25 m long w×w (1 mm×1 mm) channel.

In FIG. 8 all resized channel parameters are plotted against the original square channel position parameter. In actuality the resulting resized channel consists of 100 channels where each channel is l=0.1 m long. Therefore the entire length of the resized channel is 10 m vs. the original length of 25 m.

Results for the second case (s"=1) are actually better than the first case, since the smaller heat exchange channel geometry provides improved heat transfer performance that allows reactant channels to be resized even larger. The ΔP'/ΔP for this case is 0.138, while the total reactant channel length is 8.5 m. Simulation results for both cases are summarized in Table 1 below.

TABLE 1

Simulation results for resized reactant channels in two heat exchange channel configurations (s" = s' and s" = 1)

| Configuration | ΔP'/ΔP | Number of Channels | Total Length (m) | Maximum s' |
|---|---|---|---|---|
| s" = s' | 0.172 | 100 | 10.0 | 3.76 |
| s" = 1 | 0.138 | 85 | 8.5 | 3.98 |

Figure 9:
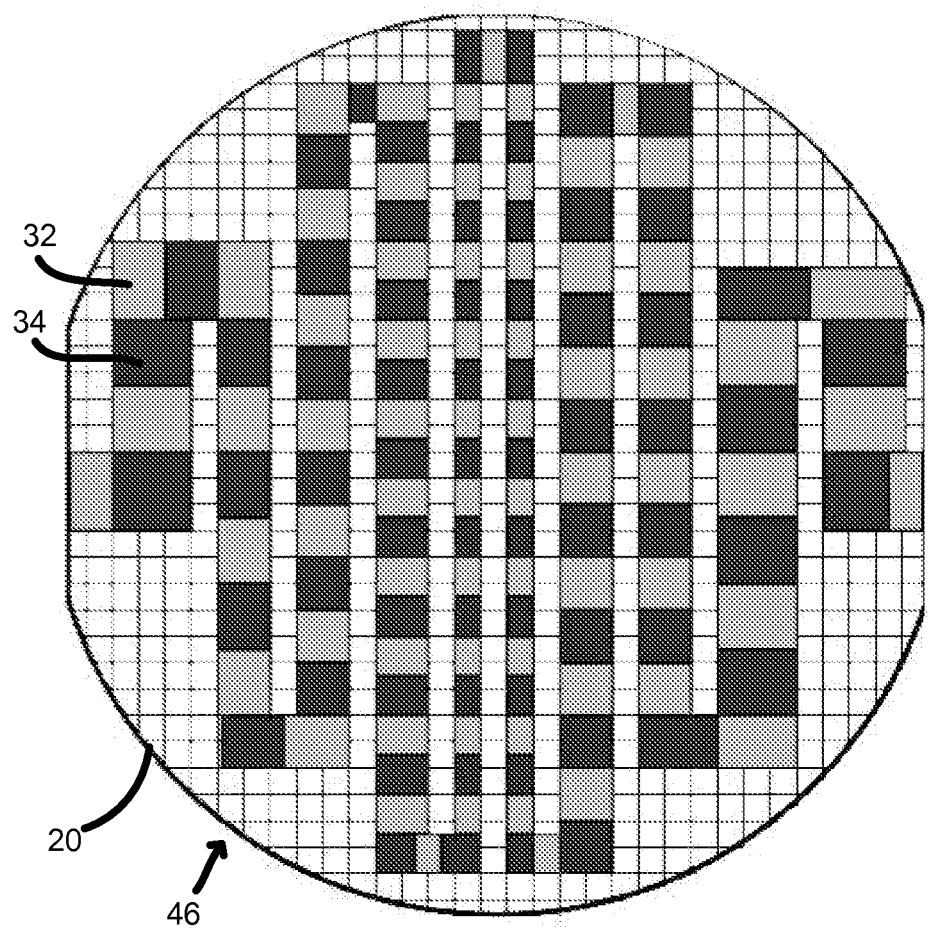
FIG. 9 is a cross-sectional or end view of a body reactor serpentine reactant channel layout using channels of variable cross-sectional area.

FIG. 9 provides a schematic diagram of a substrate end face 46 of a honeycomb body 20 with reactant channels of variable size. Here the adjacent heat exchange channels remain at a fixed size equal to the minimum channel size (s"=1 case). The s"=1 configuration enables uniform heat exchange fluid flow through heat exchange channels since all the channels are the same size. If heat exchange channels are of different sizes heat exchange fluid flow will tend to preferentially flow through larger channels, reducing the heat exchange fluid flow through smaller channels. This leveling of heat exchange performance across the substrate end face may not be desirable in certain configurations where high heat transfer performance is required in specific locations. Also, the non-uniform heat exchange channel structure makes heat transfer performance of individual heat exchange channels more difficult to assess, since the heat exchange fluid flow imbalance between large and small heat exchange channels will also depend on the total heat exchange fluid flow rate, which may not be constant or easily set in a given configuration. In general it is recommended that all heat exchange channels be of identical or similar size to minimize these heat exchange fluid flow non-uniformity affects.

Another advantage of the s"=1 case is that heat exchange channel walls that support pressurized reactant channels are closely spaced. The well-supported reactant channels can be made thinner, improving heat transfer further. The increased number of supporting walls along the reactant channel/heat exchange channel wall interface allows each supporting wall to be made thinner, maximizing the size of adjacent heat exchange channels.

The example given above was evaluated using a scaling factor s' step size of 0.05. This small value mimics a design approach where the channel size can be varied continuously in size. The honeycomb body reactor's parallel channel structure dictates that changes in channel size only occur at discrete locations (i.e. U-bends) along the fluid path. When the number of channels is large this approach provides a good approximation to a truly continuously varying channel size. Therefore in the present approach the reference to continuously variable channel sizes refers to the fact that any time the channel size is changed (e.g., at a U-bend) the new channel size can be any size (as opposed to one of a set of discrete sizes).

The reactant channels shown in FIG. 9 vary in size in both directions (vertical and horizontal in the figure). While the channel size can vary gradually and continuously along the reactant channel fluid path neighboring walls that meet the reactant channel may exhibit periodic discontinuities required to accommodate the non-uniform reactant channel sizes. These departures from a uniform wall array can lead to localized stress concentrations in regions where opposing walls do not meet one another. The non-regular wall configurations may also lead to unwanted distortions during extrusion.

The reactant channel aspect ratio α can be defined by the ratio b/a, where b and a are the lengths of the long and short sides of the channel, respectively. In a non-uniform reactant channel layout such as the one shown in FIG. 9, αa=s' and b=αs'. For typical cases α is expected to vary over a range from 1 to 2.5. The variation in reactant channel heat transfer coefficient with changes in α is given by Nu(α)/$D_h$(α), where Nu(α) is the α-dependent Nusselt number and $D_h$(α) is the hydraulic diameter equal to 2ab/(a+b) or 2αs'/(1+α) in the present case. In R. K. Shah, A. L. London, "Laminar flow forced convection in ducts," Adv. Heat Transfer (Suppl. I) (1978) is shown that, for fully developed laminar internal flow in channels of variable aspect ratio the α-dependent Nusselt number is given by $$Nu(\alpha) \propto 1 - \frac{2.0421}{\alpha} + \frac{3.0853}{\alpha^2} - \frac{2.4765}{\alpha^3} + \frac{1.0578}{\alpha^4} - \frac{0.1861}{\alpha^5} \quad (7)$$

These equations can be used to calculate the reactant channel heat transfer coefficient for a single reactant channel. In Eq. 8, the calculation of h' from Eq. 3 is modified to reflect the change in reactant channel heat transfer coefficient via an approximation that scales s' by a second-order polynomial in α:

$$h'(\alpha) = \frac{2h_0}{\frac{s'}{0.1453\alpha^2 - 0.576\alpha + 1.41} + s''} \quad (8)$$

(for $1 \leq \alpha \leq 2.5$)

Evaluation of Eq. 8 over the range of α from 1 to 2.5 shows that the heat transfer coefficient h'(α) is reduced by no more than 9% from the value obtained when α is unity and s'=s". The best case value for h'(α) over $1 \leq \alpha \leq 2.5$ is $2h_0$/(s'+s") while the worst case value is $2h_0$/(1.16s'+s").

Figure 10:
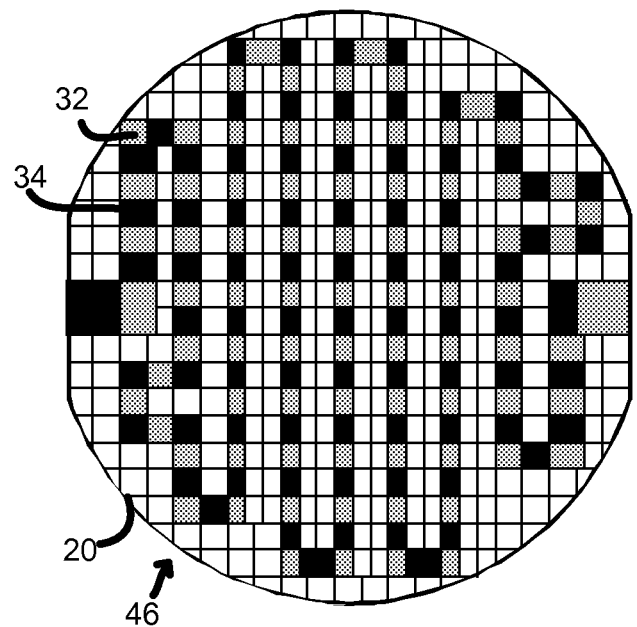
FIG. 10 shows an alternative approach for laying out non-uniform reactant channels where reactant channel sizes are primarily scaled in one dimension (i.e., horizontally in the figure.

An alternative approach for laying out non-uniform reactant channels is shown in FIG. 10, where reactant channel sizes are primarily scaled in one dimension (e.g., horizontal in FIG. 10). Channel sizes are always an integer number of cells in the vertical direction, while in the horizontal direction channels may be of variable width. In the figure the reactant channel starts at the left inlet, is reduced in width toward the middle of the substrate end face, and is enlarged at the right outlet. By arranging successive columns of the reactant channel path so that each column is the same size in the horizontal direction the number of wall discontinuities can be dramatically reduced. If necessary the heat exchange channel sizes can also be optimized to meet local heat transfer requirements.

Figure 11:
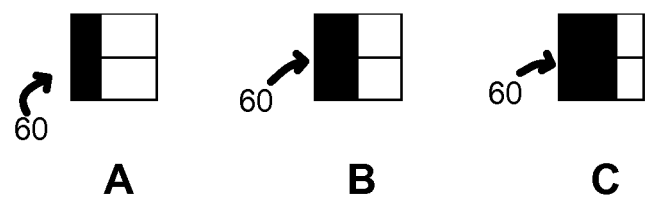
FIGS. 11A-11C are cross sections showing variable width channels in standard cells.

FIGS. 11A-C show a series of three standard patterns 60 that can be used to configure the substrate end face channel layout with variable size reactant channels. Depending on the degree of optimization required a larger or smaller number of standard patterns may be used to design a target reactant channel layout pattern. While channel width variation is illustrated in the figure, a similar approach could be taken to vary the height of selected channels.

These standard patterns simplify the design process since they can be rapidly arranged on the substrate end face in a uniform array. Standard patterns can be validated mechanically and pre-assessed for their thermodynamic and fluidic characteristics. This speeds the design and design verification process since the variable nature of the target reactant channel size is at least partially embedded within the standard patterns.

Discrete Scaling of Reactant Channels

In the above analysis the reactant channel cross-section was allowed to vary continuously along the fluid path to achieve optimal reaction conditions. This section considers reactant channel sizing approaches where channel sizes vary in discrete steps. In particular this section highlights the manufacturing advantages of reactant channel sizing approaches where all widths of all channels are integer multiples of the narrowest channel width on the substrate.

Figure 12:
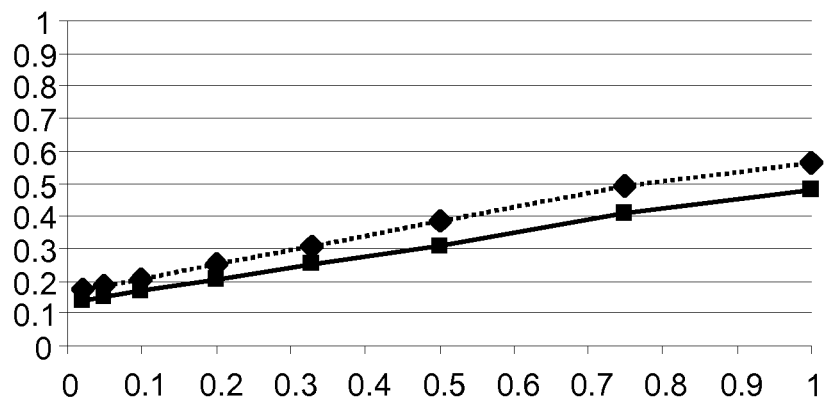
FIG. 12 is a graph of variation in pressure drop ratio $\Delta P'/\Delta P$ with reactant channel s' parameter step size.
Figure 13:
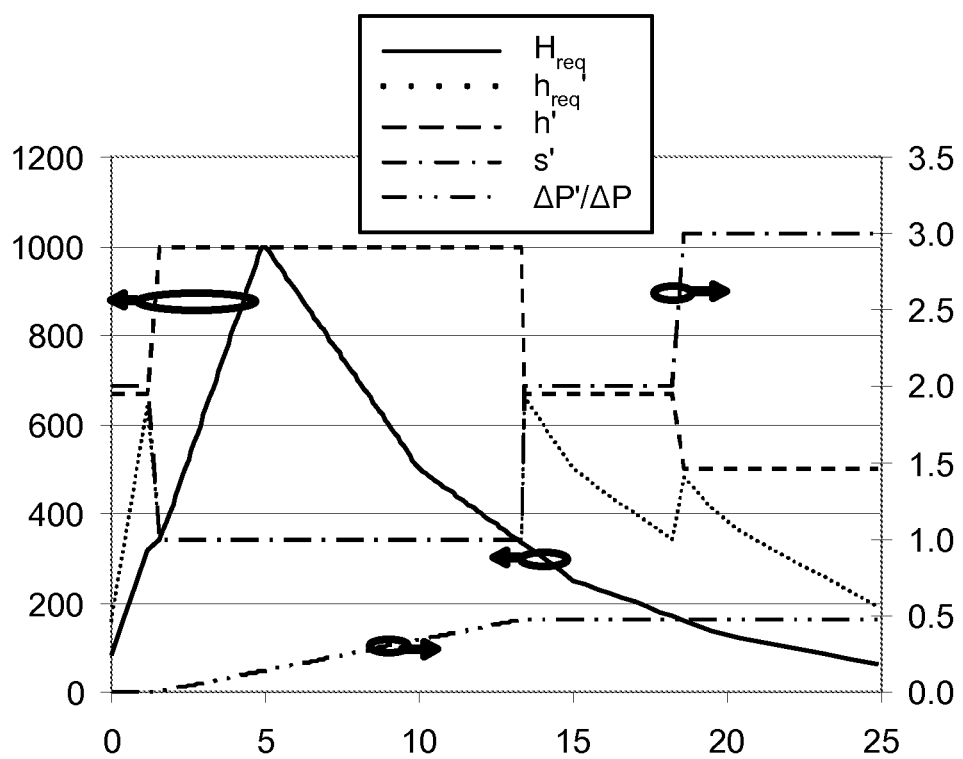
FIG. 13 is a graph of a simulation of heat exchange and pressure drop performance along a reactant channel for s' parameter step equal to 1.0 and s"=1.

FIG. 12 presents simulation results for the same 25 m long reactant channel example from the previous section, but with the reactant channel s' parameter step size varying from the previous value of 0.02 up to 1.0. Diamonds are for the case s''=s', while squares represent s'=1. Larger s' parameter step values dictate that the reactant channel is not always properly sized to exactly meet heat transfer requirements. In such cases the reactant channel is smaller than needed at some locations, so that it over-performs in heat transfer and at the same time contributes to unnecessary pressure drop. As may be seen in the figure, as the s' parameter step size increases the pressure drop ratio $\Delta P'/\Delta P$ steadily increases from 0.138 up to 0.477 for the s''=1 case. When the s' parameter step size equals 1.0 the sizable mismatch between $h_{req}'$ and h' is very clear when plotted against position along the original channel, as shown in FIG. 13.

The following discussion will focus on the case where the s' parameter step size equals 1. This approach may not achieve the same degree of reaction optimization as the continuously variable channel width approach. Still it can allow the designer to approximate the optimum channel geometry using a flexible design platform with standard patterns that simplify device fabrication. In the present approach it is assumed that all channel walls are the same thickness. Wall extent in the direction perpendicular to the honeycomb cells (or equivalently, channel sizes) and wall thickness are selected to withstand the maximum operating pressure expected in the reactant channel.

Optimization of reactant channel heat transfer performance along the fluid path involves varying the size of the reactant channel as well as the size, number and proximity of nearby heat exchange channels. In FIGS. 14A-C three different channel configurations or patterns 60 are shown where the reactant channel is the width of one substrate channel and the heat exchange channel zones are one to three channels wide (A-C, respectively). This single channel width reactant channel pattern should provide the highest heat transfer performance for the discrete channel size approach. The width of the heat exchange channel zone can be widened further, but eventually the thermal resistance of the heat exchange channel walls will limit the local improvement in heat transfer performance. For practical wall thicknesses, a point of diminishing returns is eventually reached. Alternatively, by reducing the size of the nearby region of heat exchange channels, the reactant channel utilization fraction can be increased.

A nomenclature has been developed to differentiate the various channel layout patterns 60 described here. The nomenclature is

UP–VP

Where U is the width of the serpentine channels (or "closed" channels) in integer numbers of substrate channel widths along the path formed therein, and V is the full width of the short straight channel region (or "open" channel region) existing between two adjacent serpentine channel paths. P is an optional flag following the U or V parameter that indicates that the serpentine (for U) or short straight (for V) channels are expected to operate at high pressures. In this section only the serpentine channels will be operated at high pressure.

Figure 14:
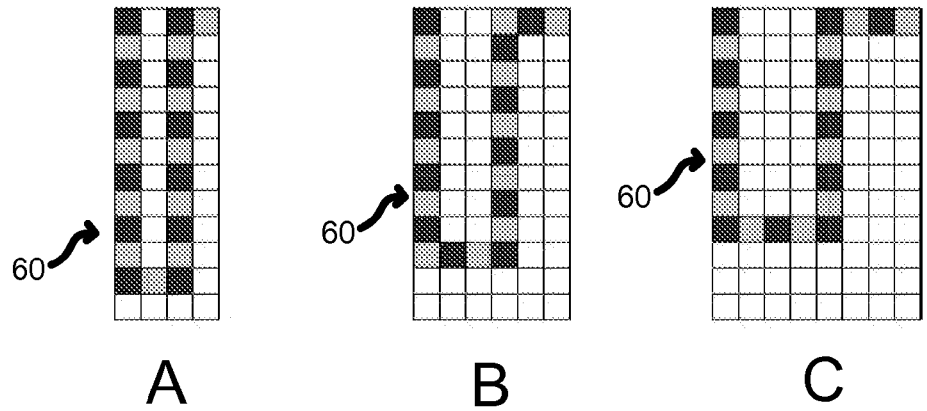
FIGS. 14A-14C are cross-sectional diagrammatic depictions of three standard layout cells for a single-channel-width reactant serpentine channel.

The channel layouts for each of the three configurations in FIG. 14 may be replicated horizontally or vertically to create larger serpentine patterns. The standard layout configurations or patterns can also be scaled in the vertical direction to create serpentine U-turns across the substrate in the plane perpendicular to the substrate cells to fill arbitrarily shaped regions of the substrate.

Figure 15:
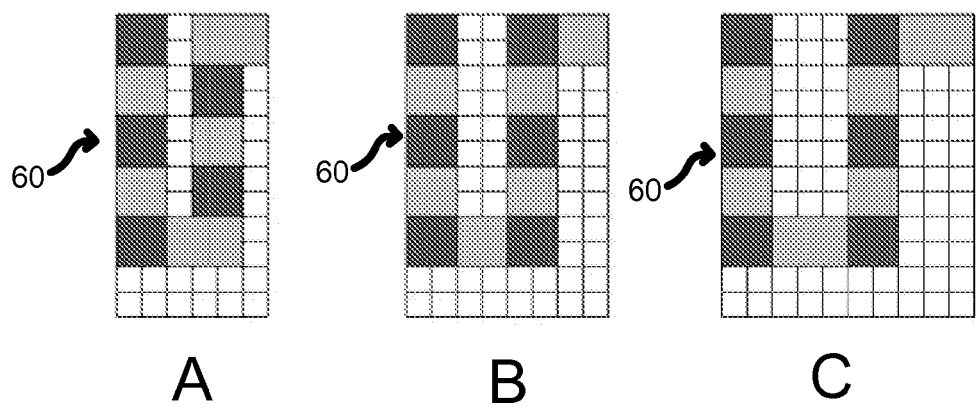
FIGS. 15A-15C are standard layout patterns for double-channel-width reactant serpentine channels.
Figure 16:
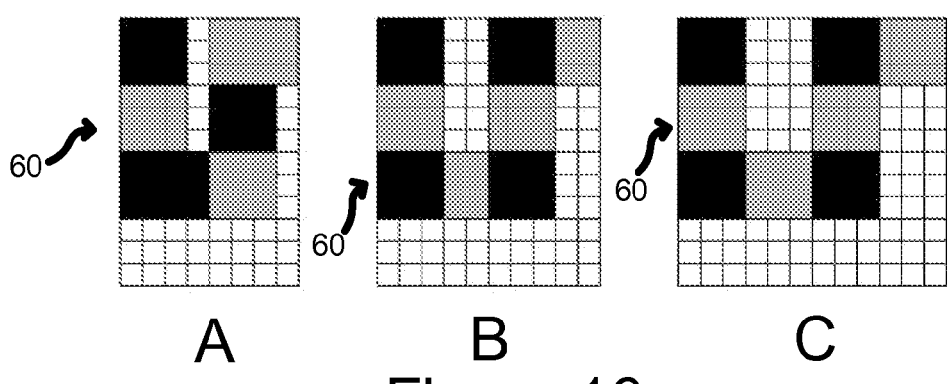
FIGS. 16A-16C are standard layout patterns for triple-channel-width reactant serpentine channels.

To reduce reactant channel pressure drop the size of the reactant channel can be increased by an integer number of substrate channels. FIGS. 15 and 16 present two sets of channel layout patterns 60 where the serpentine reactant channel is the width of two substrate channels (FIG. 15) and three substrate channels (FIG. 16). These larger size reactant channels can be formed by selectively blocking slots on a standard extrusion die, or by plunge machining in a green substrate to remove unwanted extruded body walls, for example. As with the channel layout patterns shown in FIG. 14, these patterns can be replicated in the horizontal or vertical direction to create larger serpentine channel configurations.

Figure 17:
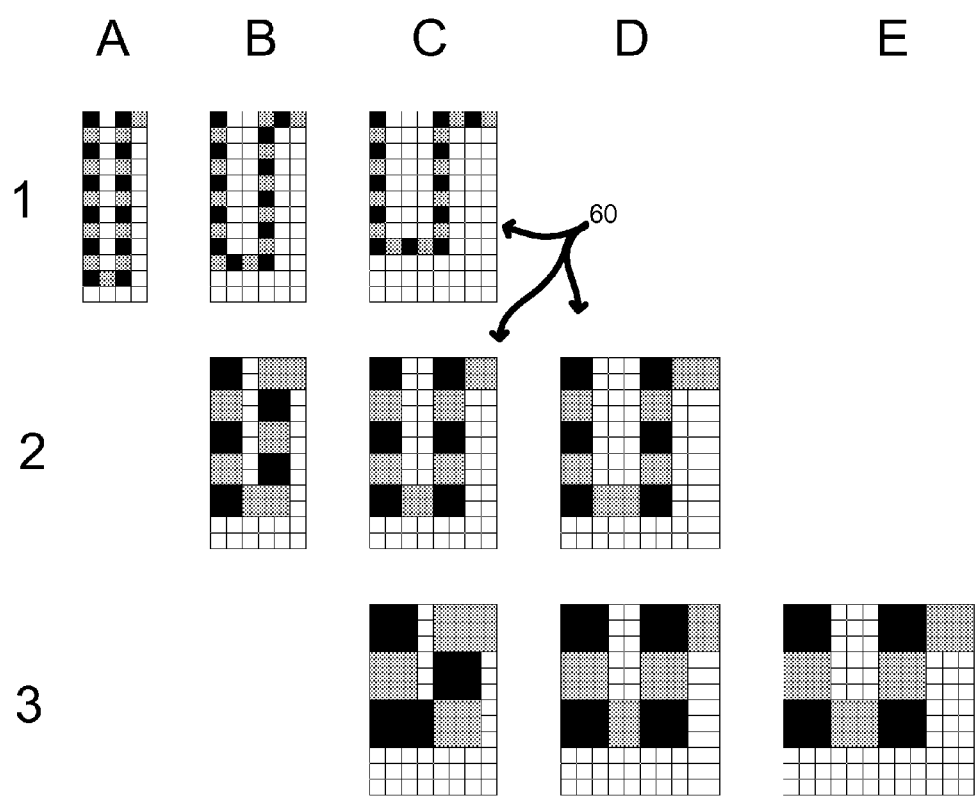
FIG. 17 is an array comparing standard layout patterns for reactant serpentine channels, including columns arranged by "pattern unit" or standard layout width and rows arranged by channel width.

Each of the channel layout patterns 60 in FIGS. 14-16 has a specific horizontal width (measured by number of substrate channels). In FIG. 17 the channel layout patterns are arranged in columns A-C according to total pattern width (measured in substrate channels). For the channel layout patterns under consideration, Column C (8 substrate channels wide) stands out as a pattern width that can be used with reactant channels that are one, two or three substrate channels wide.

Figure 18:
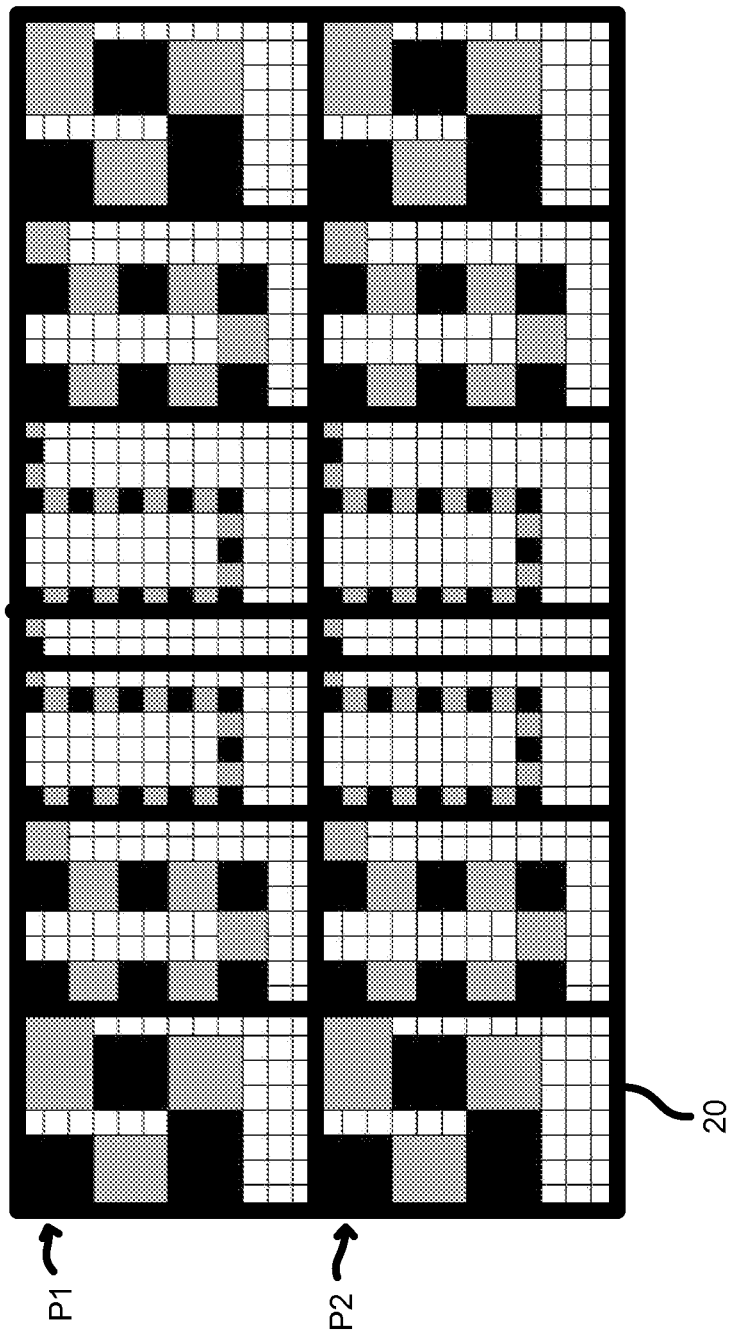
FIG. 18 is an example of a concatenation of standard patterns to form a serpentine reactant channel with non-uniform channel size.

If a standard pattern width is selected, a serpentine reaction channel of variable width can be easily constructed by joining various channel layout patterns. An example is shown in FIG. 18, where two parallel serpentine reactant paths P1 and P2 go from wide to narrow to wide from left to right in the figure.

Figure 19:
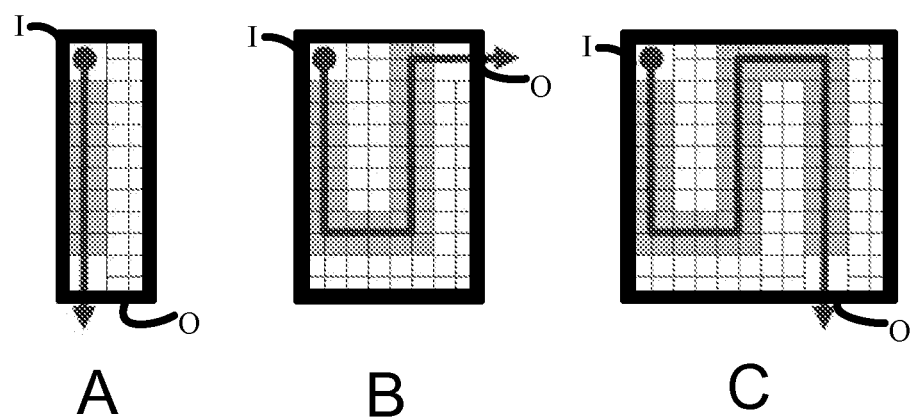
FIGS. 19A-19C are examples of standard patterns for serpentine channel interconnections in various directions (vertical, horizontal and diagonal)

A more general approach to standard layout patterns 60 may provide three different reactant channel interconnection types as shown in FIGS. 19A-C. Each of the three channel layout patterns 60 transfers fluid along a serpentine path or path element from an input corner I (e.g., upper left in FIG. 19) to an output corner O. A 2D reactant channel path across a honeycomb body reactor substrate in a plane perpendicular to the substrate channels can be assembled by joining various patterns or pattern units together.

Figure 20:
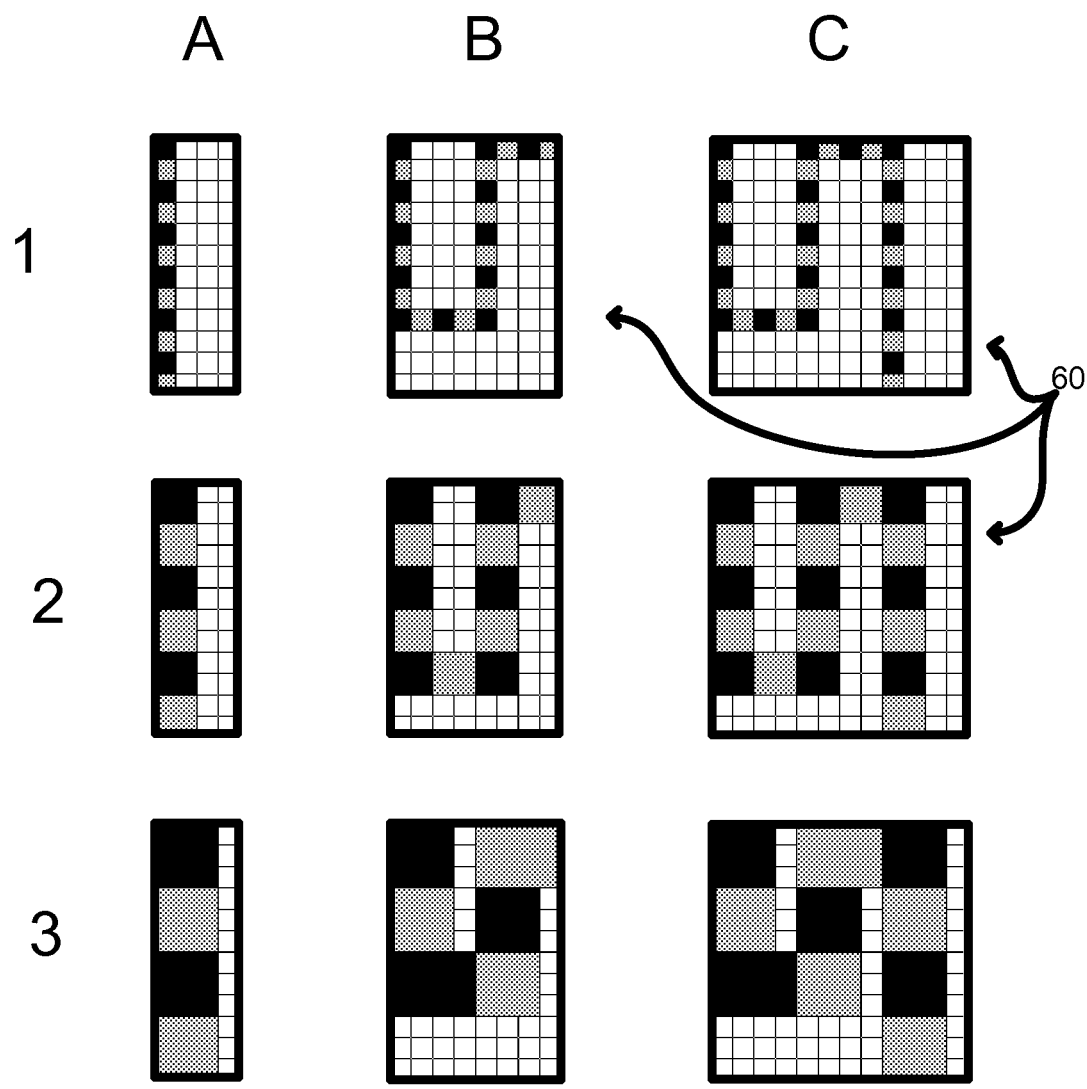
FIG. 20 is an array of standard patterns for 1, 2 and 3 channel wide serpentine interconnections, arrange in columns by connection direction.

An advantage of this unit-pattern-based channel layout approach is that channels can be laid out independently of the width of the reactant channel (at least up to a maximum reactant channel width). For example, FIG. 20 shows how reactant channels that are one, two or three substrate channels wide may all be implemented using a standard pattern that is a multiple of four channels wide, for all three input and output configurations of FIGS. 19A-C. This allows the reactant channel to be arbitrarily sized along its length without altering the path of the channel. This approach helps simplify the channel layout process when the channel path is limited by other design constrains (for example, by the required location of input and output ports or by a particular required channel-free margin around the perimeter of the substrate). Using standard pattern units also speeds design qualification, since pattern unit-based mechanical modeling and pressure testing of reactant channels can be easily extended over the entire substrate in the direction perpendicular to the substrate channels.

In some cases it may be desirable to include multiple up-and-down serpentine passes within a single pattern unit to reduce the area associated with heat exchange channels adjacent to reactant channels. For example the pattern in Row 1, Column C of FIG. 20 could have additional bends within the plane of the figure in the serpentine reactant paths, if desired, to increase the reactant channel utilization fraction or for other reasons.

Standardization of channel layout pattern unit sizes may also lead to advantages in mechanical machining of honeycomb body reactor U-bend channel regions. For example, instead of using a cutting tool that is only able to machine a single channel wall, a ganged cutting head may be used that provides multiple cutting surfaces for machining multiple channel walls within the same pattern unit simultaneously. The cutting head would accommodate minor variations in extruded substrate channel locations due to slump or distortion. Various cutting heads could be used to create all the required channel machining for a typical honeycomb body reactor. The cutting head could be actuated by low-frequency mechanical displacement (e.g., sawing) or ultrasonic agitation.

Reactant Flow in Straight or "Open" Channels

An alternative configuration for honeycomb body reactor operation involves heat exchange fluid flow through serpentine (or "closed") channels of the honeycomb body reactor, and reactant flow through short straight (or "open") channels. It would appear difficult to vary the reactant channel cross-sectional area for this configuration since the extrusion process typically creates all short straight channels with uniform cross-sectional area along the channel length. The solution presented below varies the reactant channel cross-section area through concatenation of multiple short straight paths in multiple stacked honeycomb bodies.

Figure 25:
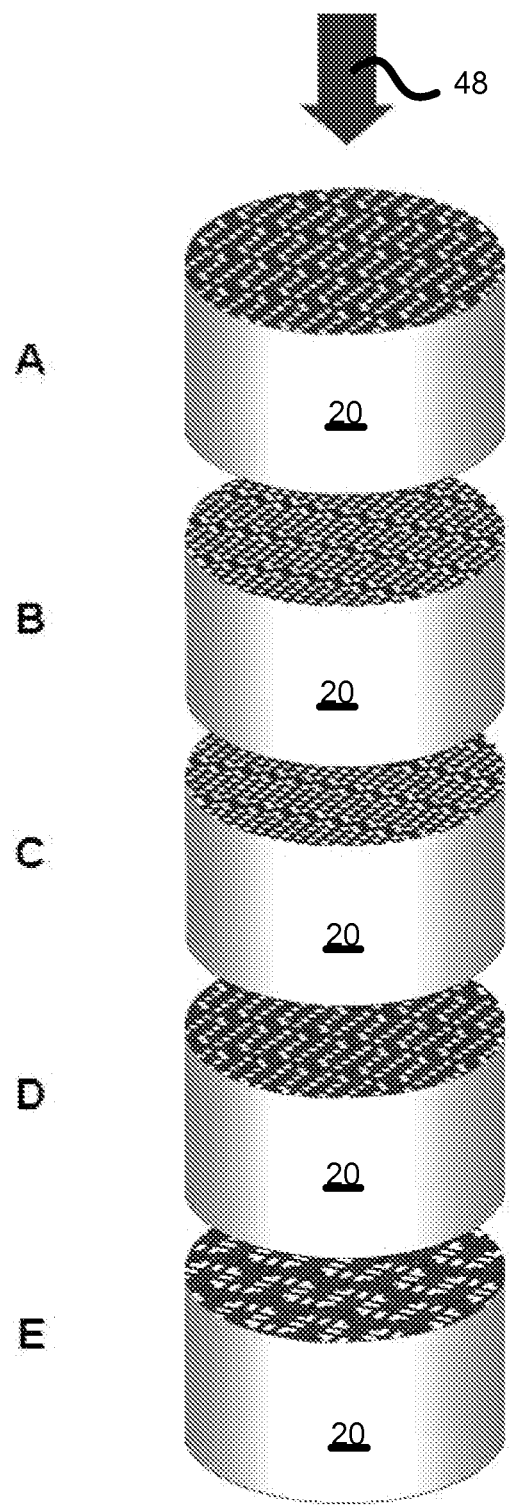
FIG. 25 is a reactor comprising stacked honeycomb body substrates that cooperate to vary the short straight reactant channel cross-section along the reactant flow path.

As shown in FIG. 25, multiple honeycomb body reactor substrates 20 may be stacked so that reactant flows through the short straight or "open" channels in successive honeycomb bodies. Heat exchange for each honeycomb body 20 is provided by fluid flow through serpentine channel paths. FIGS. 21A-C show three channel layout patterns that all have heat exchange channels that are one substrate channel wide. The width of nearby short straight reactant channels increases from one to three substrate channels from FIG. 21A-C, respectively. This approach leverages the discrete channel size approach presented in above, but continuously-variable width short straight reactant channels are also possible. The naming scheme for these and following channel layouts may follow the nomenclature developed in the previous section.

The width of the serpentine heat exchange channel can be increased to equal the width of two substrate channels (FIGS. 22A-C) or three substrate channels (FIGS. 23A-C). When the short straight reactant channel width is increased above the width of one substrate channel (as in FIGS. 22B and C) closely spaced buttressing walls are required within the serpentine heat exchange channel(s) to support the broad reactant channel wall under high reactant channel operating pressures. These buttressing walls reduce the cross-section of heat exchange channels, leading to an increase in heat exchange fluid pressure drop. Fortunately in this case the heat exchange channels are also configured in parallel, providing some reduction in heat exchange channel pressure drop.

Figure 21:
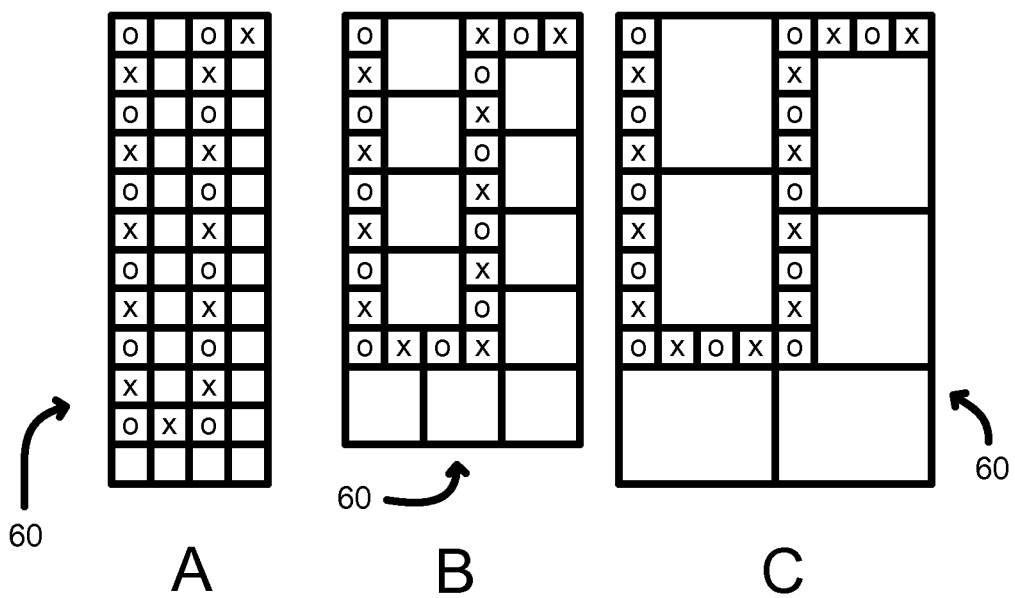
FIGS. 21A-21C are standard layout patterns for single-channel-width serpentine heat exchange.
Figure 22:
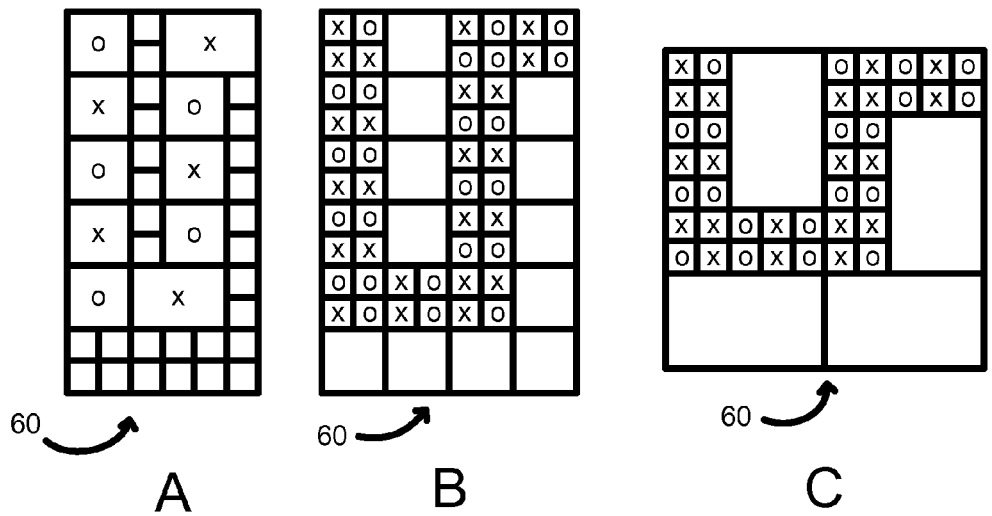
FIGS. 22A-22C are standard layout patterns for double-channel-width serpentine heat exchange channel adjacent to reactant channel in short straight channel.
Figure 23:
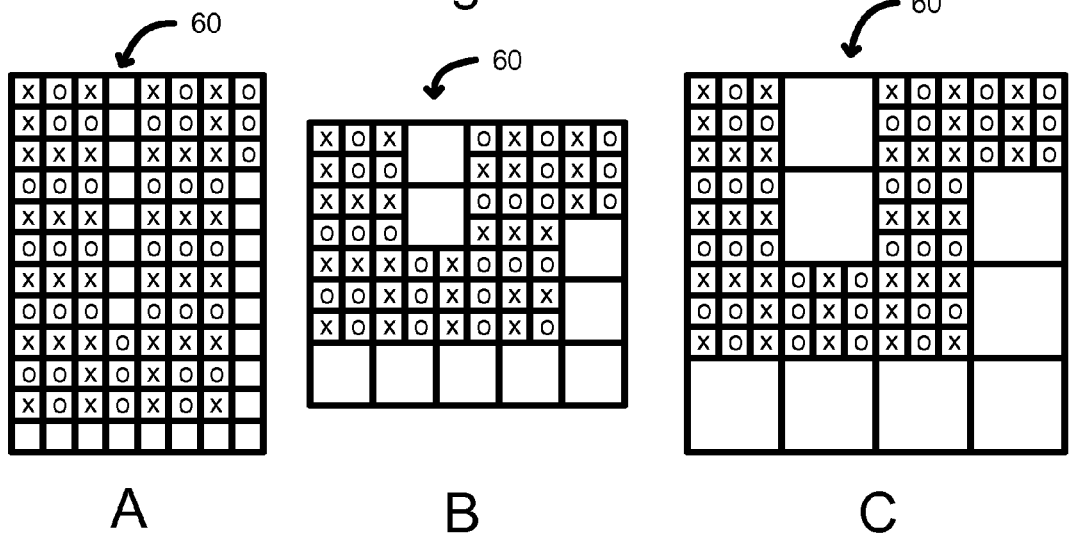
FIGS. 23A-C are standard layout patterns for triple-channel-width serpentine heat exchange channels adjacent to reactant channels in short straight channel.
Figure 24:
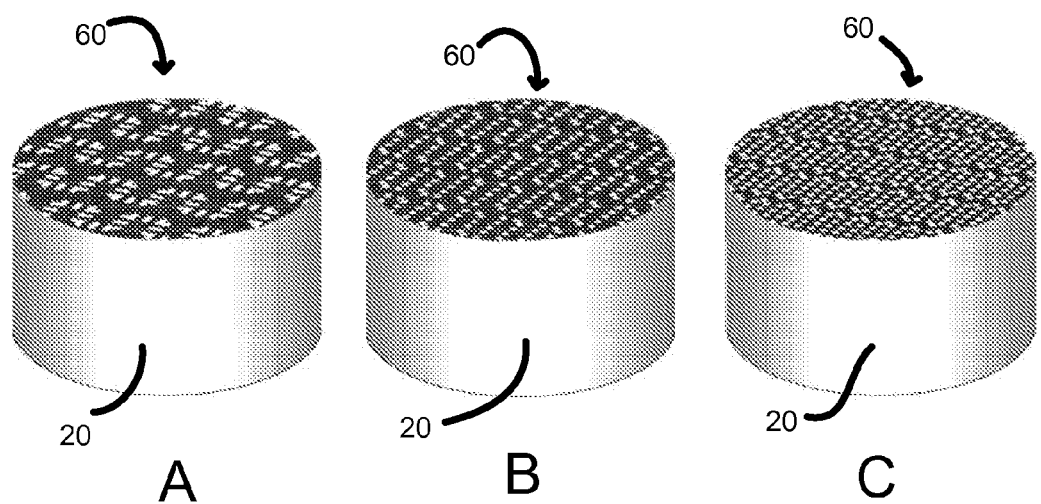
FIGS. 24A-24C are three examples of body honeycomb substrates with channel layout patterns replicated across end face.

The channel layout patterns such as those shown in FIGS. 21-23 can be replicated across the cross-section of a honeycomb body reactor substrate as in FIG. 24, for example. The uniform channel pattern ensures that reactant fluid flow through short straight channels is uniform, so as to minimize residence time dispersion.

By stacking honeycomb body reactor substrates 20 with different channel layout patterns A-E, it is possible to profile the reactant channel heat transfer performance while minimizing total reactant channel pressure drop. FIG. 25 shows such a stacked honeycomb body reactor configuration where a short straight reactant channel cross-section varies from medium to small to medium to large moving through substrates 20 having varying patterns A-E. Additional spacer bodies (not shown) may be added between bodies to improve flooding and flow uniformity.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

What is claimed is:

1. A honeycomb body having first and second ends and a common direction extending from the first end toward the second end, the body having cells extending along the common direction, the body further having a fluid passage having a length and extending through the body along successive cells of the body in a first serpentine pattern in a plane parallel to the common direction and in a second serpentine pattern in a plane perpendicular to the common direction, said fluid passage having a cross section in a plane perpendicular to the common direction, said cross section varying in step-wise fashion.

2. The body of claim 1 wherein said cross section of said fluid passage decreases then increases.

3. The body according to claim 1 wherein the fluid passage varies step-wise in cross section in steps that are positive integer multiples of a cross section of a single cell of the cells of the body.

* * * * *